UNITED STATES PATENT OFFICE.

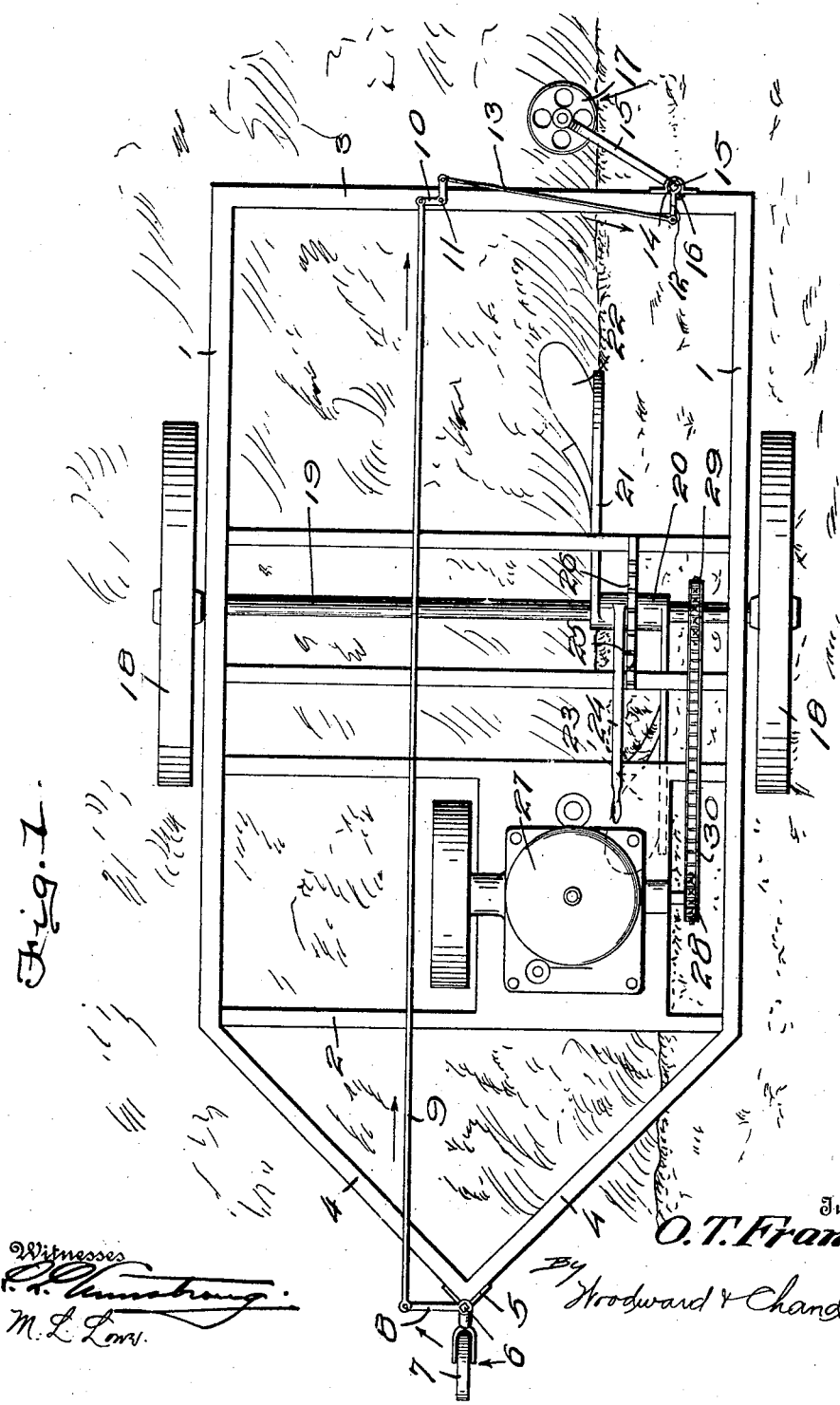

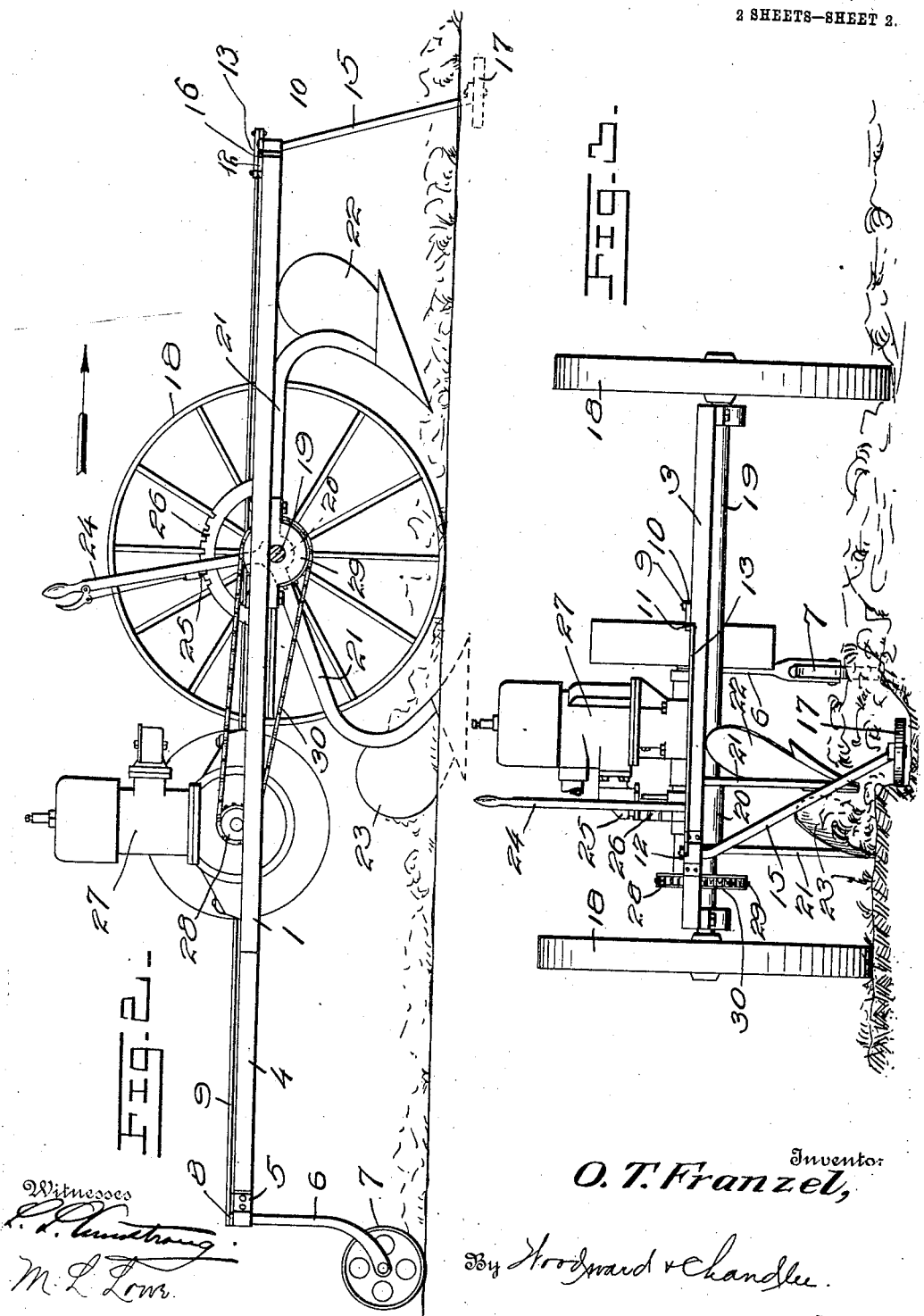

OTTO T. FRANZEL, OF CUMMINGS, KANSAS.

REVERSIBLE PLOW.

1,087,359.  Specification of Letters Patent.  Patented Feb. 17, 1914.

Application filed April 15, 1910. Serial No. 555,617.

*To all whom it may concern:*

Be it known that I, OTTO T. FRANZEL, a citizen of the United States, residing at Cummings, in the county of Atchison and State of Kansas, have invented certain new and useful Improvements in Reversible Plows, of which the following is a specification.

This invention relates to improvements in plows, and has for its principal object to provide a plow which is adapted to move back and forth across the field without the necessity of turning at the end of the furrow.

Another object is to provide a plowing machine provided with a pair of reversely acting plows thereon, and which are adapted to be swung into and out of operative position by a suitable means on the frame of the machine.

A further object of the present invention, is to provide a plowing machine, which is propelled by a suitable motor mounted thereon, and which will travel across the field to form a furrow, and without turning the machine around, be propelled back across the field again to form another furrow.

A still further object is to provide a plowing machine propelled back and forth across a field to form furrows, and carrying a means running in the previously made furrow to guide the machine and produce the next furrow in perfect parallel alinement with the first one.

A still further object is to provide a plowing machine having a steering wheel at one end, and means running in the previously made furrow controlling the movement of the steering wheel to plow the next furrow parallel with the first one.

With these and other objects in view, the present invention consists in the construction, combination and arrangement of the parts as will be more fully hereinafter described in the specification and particularly pointed out in the claims, but it will be understood that changes in the structure shown and described may be made within the scope of the claims without departing from the spirit of the invention.

In the drawings; Figure 1 is a top plan view of the machine in operation in a field, Fig. 2 is a side elevation of the machine showing the reversible plows mounted thereon, and the guiding mechanism, for engaging in the furrow, and Fig. 3 is a front elevation of the machine.

Referring now to the drawings in which is illustrated a plowing machine made in accordance with the preferred embodiment of my invention, it will be seen that the machine comprises a rectangular frame work having the side bars 1 and the end bars connecting the side bars and numbered 2 and 3. Extending forwardly from the end bar 2 are the converging strips 4 having in the apex a journal 5 in which is rotatably mounted the shaft 6 of the caster wheel 7. Secured to the upper end of the shaft 6 is a laterally extending arm 8 to which is connected a controlling rod or link 9. On the bar 3 of the frame and near one end thereof is a bell crank 10 pivoted at 11 and to one arm of which is loosely connected the rod or link 9. At the opposite end of the bar 3 is a similar lever 12 to one arm of which is pivotally connected a connecting rod 13, whose other end is also connected to the other arm of the lever 10. The lever 12 is formed at its angle with an eye 14 adapted to receive the upper end of the standard 15 and be adjustable thereon by means of the set screw 16. At the lower end of the standard 15 I have provided the furrow engaging wheel 17.

The frame of the machine is mounted on a pair of wheels 18 on the end of an axle 19. On the axle 19 and mounted on the frame is a plow carrying member 20. This member extends toward the front and rear of the machine and forms on each side of the pivot a plow beam 21 to which are secured the plows 22 and 23, one of which is adapted to make a furrow across the field in one direction and the other one in the opposite direction. On one end of the member 20 is mounted an operating lever 24 which carries a pawl 25 adapted to engage the teeth of a ratchet segment 26 mounted on one side of the frame.

The machine is to be propelled by a motor, preferably a gas engine 27 mounted on the frame and geared to the wheels supporting the frame by means of the sprockets 28 and 29 and the chain 30. Of course, it will be understood that any other suitable form of motor may be used to propel the machine.

In the operation of the machine the same is started from, for instance, the left side of the field as seen in Fig. 1 and the plow 23 is lowered by means of the lever 24 and the machine started across the field. The plow 22 is then lowered into engagement with the ground thus raising the plow 23 and the movement of the machine reversed to travel back across the field. The wheel 17 is then engaged against the wall of the furrow just made and as the machine proceeds across the field, motion is imparted to the caster wheel 7, from the wheel 17 by the bell crank 12, link 13, bell crank 10, link 9 and arm 8, to cause the machine to follow the furrow and adjust itself to any inequalities of the furrow wall. Should the wheel 17 engage with an elevation in the wall of the furrow, said wheel would be moved with the standard 15 toward the machine, thus moving the levers and cranks in the direction indicated by the solid arrows. Should the wheel 17 encounter a depression in the furrow wall, the levers and cranks would move in the opposite direction. Thus in the first instance, when due to a projection in the furrow wall, the wheel 17 is moved away from a straight line, the machine would be guided inward toward the land, and keep the cut of the wall in a straight line. Similarly, when the wheel 17 encountered a depression, the machine would be guided away from the land to take a little less at the depression, so that the wall would be straight. It will, of course, be understood that the operator holds the rear end of the machine, during its travel across the field, so that the machine is held to its course. The machine is then guided at the end of the furrow to bring the wheel 17 into the second furrow, when it is started back across the field with the plow 23 in action. This is proceeded with the entire length of the field until the same is all plowed.

The plows 22 and 23 are arranged in opposite directions so as to throw the dirt on the same side of the furrow.

From the foregoing, when taken in connection with the drawings, it will readily be seen that I have provided a simple and effective plowing machine which is adapted to operate backward and forward across the field and precludes the necessity of turning when the end of the furrow is reached, and also an efficient means for guiding the machine to form the furrows parallel with the preceding ones. This will produce a good appearance to the field and the plants will be more evenly spaced than if the field were plowed with the eye as a guide.

What is claimed is:

1. In a plowing machine having a frame supported by wheels, a steering wheel on one end of the frame, a bell crank lever mounted on the opposite end of the frame, a furrow engaging wheel mounted on the last named end of the machine and adjacent said bell crank, an arm on said furrow wheel, a connecting rod between the said arm and the bell crank, and a link connected to the said arm and the steering wheel whereby the movement of the furrow wheel is communicated to the steering wheel to guide the machine.

2. In a plowing machine having a frame, said frame having one of its ends tapering, a vertical shaft mounted in said tapering end, a caster wheel on said shaft, an arm on the upper end of said shaft, a bell crank on the opposite end of the frame, a vertical shaft mounted at one side of the last named end of the frame, a laterally extending arm at the lower end of the last named shaft, a furrow engaging wheel on said arm, a second arm on the upper end of the last named shaft, a link connected to said second named arm and to one arm of the bell crank, and a link connected to the other arm of the bell crank and to the arm of the caster wheel whereby movement due to the irregularities in the furrow are communicated to the caster wheel to guide the machine.

In testimony whereof I affix my signature in presence of two witnesses.

OTTO T. FRANZEL.

Witnesses:
 WM. KRALL,
 F. J. LEDOUX.